US 6,587,044 B2

(12) United States Patent
Ehrlich et al.

(10) Patent No.: US 6,587,044 B2
(45) Date of Patent: Jul. 1, 2003

(54) BRAKE LAMP ILLUMINATION ON A TRAILER BY SENSING WHEEL SPEED DECELERATION

(75) Inventors: Rodney P. Ehrlich, Monticello, IN (US); Francis S. Smidler, Lafayette, IN (US)

(73) Assignee: Wabash Technology Corporation, Arlington Hills, IL (US)

( * ) Notice: Subject to any disclaimer, the term of this patent is extended or adjusted under 35 U.S.C. 154(b) by 118 days.

(21) Appl. No.: 09/927,837

(22) Filed: Aug. 10, 2001

(65) Prior Publication Data

US 2002/0047778 A1 Apr. 25, 2002

Related U.S. Application Data

(60) Provisional application No. 60/225,149, filed on Aug. 14, 2000.

(51) Int. Cl.[7] .................................................. B60Q 1/00
(52) U.S. Cl. ...................... 340/441; 340/467; 340/479; 180/282; 303/123; 303/124; 307/10.1
(58) Field of Search ................................. 340/441, 479, 340/453, 452, 463, 467, 431; 188/1.11 R, 1.11 E; 303/123, 124, 125, 121, 138, 122.03, 166; 180/271, 282; 307/9.1, 10.1, 10.8

(56) References Cited

U.S. PATENT DOCUMENTS

| 5,481,243 A | * | 1/1996 | Lurie et al. ................. 340/467 |
| 5,929,532 A | * | 7/1999 | Sell ............................ 307/9.1 |
| 6,020,814 A | * | 2/2000 | Robert ....................... 340/467 |
| 6,092,415 A | * | 7/2000 | Borenius et al. ........... 73/146.2 |

* cited by examiner

Primary Examiner—Daniel J. Wu
Assistant Examiner—Davetta W. Goins
(74) Attorney, Agent, or Firm—Trexler, Bushnell, Giangiori, Blackstone & Marr, LTD

(57) ABSTRACT

A brake lamp illumination system for a trailer senses when the speed of the wheels decreases. If the system detects such a deceleration, the system senses whether power has been supplied to illuminate brake lamps provided on the vehicle. If no power is detected in the circuit which supplies power to the brake lamps, power is directed to the circuit to illuminate the brake lamps.

9 Claims, 3 Drawing Sheets

BRAKE LAMP ILLUMINATION ON A TRAILER BY SENSING WHEEL SPEED DECELERATION

RELATED APPLICATIONS

This application claims the priority of provisional application Ser. No. 60/225,149, filed on Aug. 14, 2000 and entitled "Brake Light Illumination on Trailers by Sensing Deceleration".

BACKGROUND OF THE INVENTION

This invention is generally directed to a brake lamp illumination system for a trailer. More particularly, the invention contemplates a brake lamp illumination system for a trailer which is activated by sensing the speed of wheel rotation or deceleration of a wheel.

A standard tractor-trailer includes a tractor and a trailer. A seven-way connector provides the electrical connection between the tractor and the trailer. The seven-way connector includes a wiring harness which has seven circuits therein, which, as known in the art, are coded as the brown circuit, the green circuit, the red circuit, the white (ground) circuit, the black circuit, the yellow circuit and the blue (auxiliary) circuit.

A standard tractor-trailer uses two braking systems, a primary service brake and a secondary emergency/parking brake. The primary service brake is a fully pneumatic system, using air pressure for signaling the application of the brakes. Federally required brake lamps are used to indicate primary service brake application. The brake lamps are controlled by a pneumatic pressure switch mounted on the tractor and connected to the service brake control line. Thus, when the service brake is applied, the pneumatic pressure switch closes, completing the electrical circuit to the brake lamps mounted on the tractor. The electrical connection to the brake lamps is provided by the red circuit of the seven-way connector to the brake lamps on the trailer.

The secondary emergency/parking brake uses the loss of air to signal the application of the springs to apply the brakes. Thus, if air pressure in the braking system is lost, the emergency brake will automatically cause large springs on the brakes to apply the brakes to stop the tractor-trailer. Because the brake pedal has not been applied in this situation, the pneumatic pressure switch has not closed to signal power to be supplied to the brake lamps through the red circuit. Therefore, when the secondary braking system is used to slow the vehicle, the brake lamps are not illuminated.

The problem with this braking system is that upon an emergency brake activation, the driver of the vehicle following the trailer does not have warning that the trailer is rapidly coming to a stop. It is obvious what can happen when a trailer stops rapidly without warning to the driver behind it. Additionally, no warning is given to the driver behind the trailer when the trailer is slowing down for a reason other than application of the service brakes.

Anti-lock braking systems (ABS) are currently used in most trailers. Anti-lock braking systems aid the braking system of a vehicle by preventing the wheels of a vehicle from locking up during braking. Locking-up of the wheel reduces the effectiveness of the braking and allows less control of the vehicle. If the rotation of the wheel suddenly changes, then the ABS senses that the wheel has locked-up. Once the ABS senses brake lock-up, a central processing unit (CPU) signals the service valve to momentarily release the brakes to allow the wheel to rotate again and then signals to reapply the brakes. Thus, the ABS allows for greater control of the vehicle during braking.

The blue (auxiliary) circuit of the seven way connector is used to power the ABS. Since approximately 1997 in North America, new tractors have been built so that the blue circuit provides full time power for the ABS. For tractors built prior to that time, the blue circuit was switchable. Thus, when a tractor built prior to 1997 is in operation, power may or may not be supplied to the ABS through the blue circuit. Because it is possible that a new trailer with ABS will be pulled by an older tractor which does not provide full time power to the ABS through the blue circuit, the red circuit is electrically connected to the ABS as an alternate means of powering the ABS when power is not provided through the blue circuit. Because it is only necessary to power the ABS when the brakes are applied, providing power to the ABS through the red circuit is sufficient. Thus, when the brakes are applied power will be provided to the ABS and to the brake lamps through the red circuit.

Changes in federal law now require full time power to the ABS during operation. The present invention, which is described in detail below, is operable only with new tractors which have full time power to the blue circuit for the ABS.

The present invention provides a brake lamp illumination system which overcomes the problems presented in the prior art and which provides additional advantages over the prior art, such advantages will become clear upon a reading of the attached specification in combination with a study of the drawings.

OBJECTS AND SUMMARY OF THE INVENTION

A general object of the present invention is to provide a brake lamp illumination system for a trailer in which the brake lamps will illuminate without use of the brake pedal.

An object of the present invention is to provide a brake lamp illumination system for a trailer in which the brake lamps will illuminate when the emergency brake is applied.

Another object of the present invention is to provide a brake lamp illumination system for a trailer in which the brake lamps will illuminate when the vehicle decelerates.

A specific object of the present invention is to provide a brake lamp illumination system in which the brake lamps of the trailer are illuminated when a wheel speed sensor senses deceleration of the wheel of the vehicle.

A specific object of the present invention is to provide a brake lamp illumination system in which the brake lamps of the trailer are illuminated when an accelerometer senses deceleration of the wheels of the trailer.

Briefly, and in accordance with the foregoing, the present invention discloses a brake lamp illumination system for a trailer in which the brake lamps of the trailer are illuminated not only when the brake pedal is applied, but also when the speed of the trailer is decreasing.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
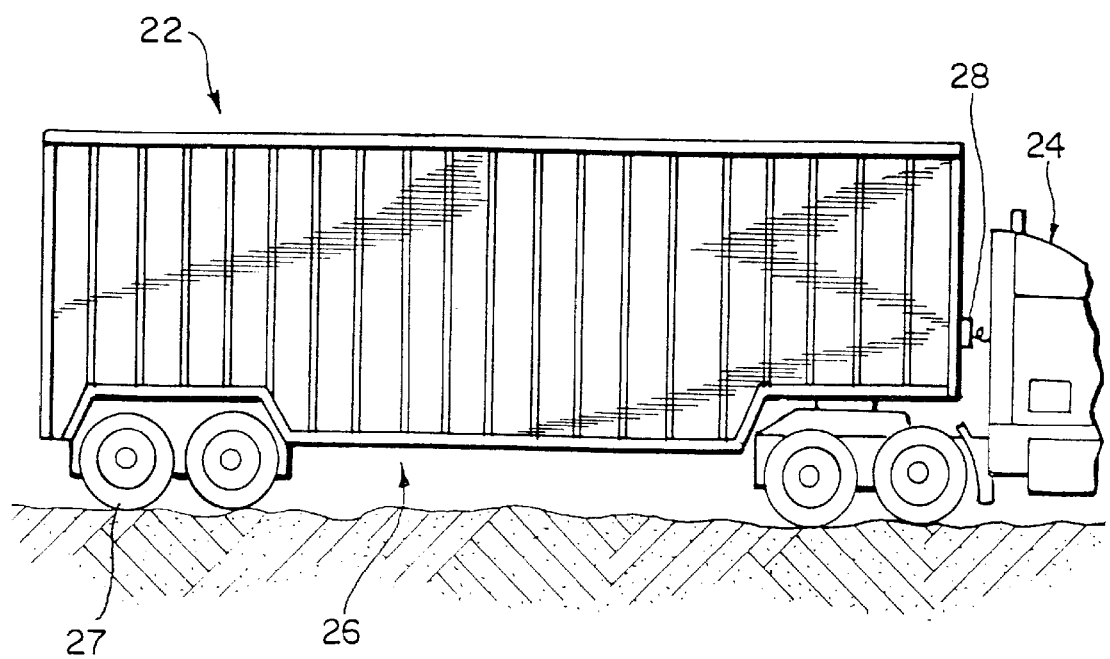
FIG. 1 is a side elevational view of a trailer and a partial side elevational view of a tractor on which the brake lamp illumination system of the present invention is used.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The brake lamp illumination system 20 of the present invention is used in connection with a tractor-trailer 22 as shown in FIG. 1. The tractor-trailer 22 includes a tractor 24 and the trailer 26. Wheels 27 are mounted toward the rear end of the trailer 26. The tractor 24 is electrically connected to the trailer 26 through a conventional seven-way connector 28. The seven-way connector 28 includes a wiring harness which has seven circuits therein, which, as known in the art, are coded as the brown circuit, the green circuit, the red circuit, the white (ground) circuit, the black circuit, the yellow circuit and the blue (auxiliary) circuit.

Figure 2:
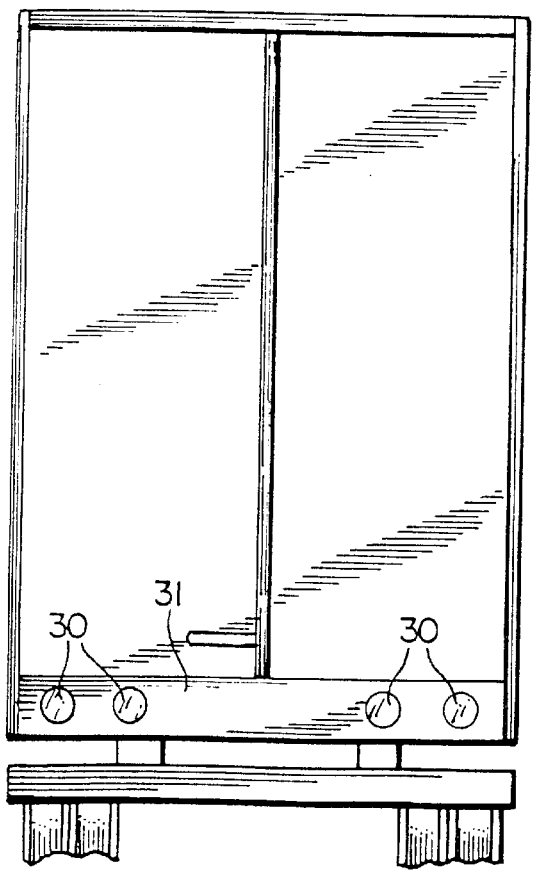
FIG. 2 is a rear elevational view of a trailer.

As shown in FIG. 2, brake lamps 30 are located on the rear sill 31 of the trailer 26. The present invention provides a system 20 for illuminating the brake lamps 30 on a trailer 26 when the trailer 26 decelerates by any means other than when the brake pedal is applied and thus the pressure switch is not activated. This deceleration can occur by the application of the emergency brakes due to a system failure, the use of an engine brake system to decelerate, or the deceleration due to gliding on an up slope.

Figure 3:
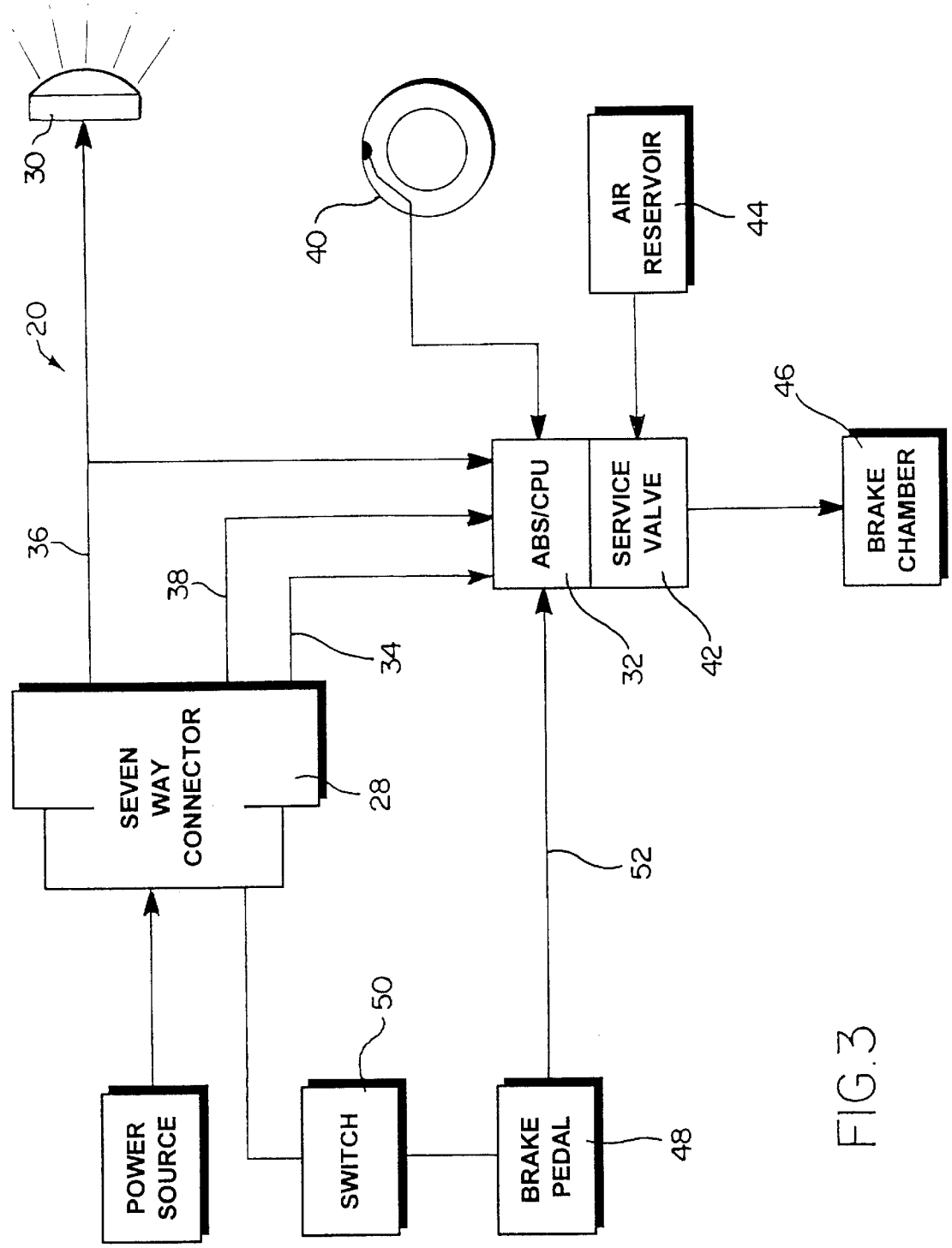
FIG. 3 is a diagram illustrating a first embodiment of the brake lamp illumination system of the present invention.

As shown in FIG. 3, the brake lamp illumination system 20 includes a central processing unit (CPU) 32, the white circuit 34, the red circuit 36, the blue circuit 38, a brake lamp 30 provided on the trailer 26, and a wheel speed sensor 40. Preferably, the CPU 32 of the illumination system is the CPU of an anti-lock braking system (ABS) provided on the trailer 26. However, the CPU 32 may be a stand-alone unit or one that provides additional function(s). Because ABS is mandated on trailers in the United States of America and in other countries, the CPU in the ABS is ideal for use.

The service valve 42 which is mounted on the trailer 26 and which is in communication with the CPU 32 receives a supply of air from an air reservoir 44 provided on the trailer 26. Air which is utilized by the braking system of the trailer 26 is supplied to brake chambers 46 through the service valve 42. The service valve 42 may be integral with the ABS.

Electrical connections are provided between the seven-way connector 28 and the CPU 32 through the white circuit 34, the red circuit 36, and the blue circuit 38.

The white circuit 34 provides a common ground.

The red circuit 36 also provides an electrical connection between the CPU 32 and the brake lamps 30 on the trailer 26. When the brake pedal 48 is applied by the operator, the brake pressure switch 50 closes and power is supplied to the red circuit 36 which results in illumination of the brake lamp 30.

The present brake lamp illumination system 20 is operable only with newer tractors which have full-time power from the tractor 24 to the blue circuit 38. The blue circuit 38 is connected between the seven way connector 28 and the CPU 32. Thus, the blue circuit 38 of the present invention provides continuous power to the CPU 32 from the tractor 20 during operation.

The CPU 32 is electronically connected to and receives wheel speed information from a wheel speed sensor 40. The wheel speed sensor 40 could, for example, be of the type described in U.S. patent application Ser. No. 09/747,119 which is incorporated in its entirety herein by reference. The wheel speed sensor 40 is mounted on the wheel 27 of the trailer 26 and information regarding the changes in wheel speed which are sensed by the wheel speed sensor 40 is communicated to the CPU 32. In addition to providing information to the ABS relating to wheel lock-up as described above, the wheel speed sensor 40 provides information to the CPU 32 relating to the speed of rotation of the wheels of the trailer 26. Based upon the information, the CPU 32 determines whether power is to be supplied to the red circuit 36 to illuminate the brake lamps 30.

When the wheel speed sensor 40 senses that the rotational speed of the wheels is decreasing, this could be for a number of reasons. For example, the decrease could be because of application of the brake pedal 48 and therefore use of the primary braking system, because the trailer 22 is traveling up-hill, or because the emergency brake has been applied.

If the deceleration is because of the application of the brake pedal 48, the pressure switch 50 will be closed as a result of the application of the brake pedal and power will be supplied from the tractor 24 through the red circuit 36 and to the brake lamps 30. If deceleration is because of a reason other than application of the brake pedal 48, such as, for example, because the trailer 22 is traveling up hill, the pressure switch 50 will not be closed and power will not be supplied from the tractor 24 to the brake lamps 30 through the red circuit 36.

Because the red circuit 36 is also connected to the CPU 32, the CPU 32 can detect if power is present in the red circuit 36 to illuminate the brakes lamps 40. If power is already present in the red circuit 36, for example, because the brake pedal 48 has been applied, the brake lamps 30 will already be illuminated. However, if the CPU 36 receives information from the wheel speed sensor 40 that the trailer 26 is decelerating but power is not detected by the CPU 36 in the red circuit 36 the brake lamp 30 will need to be illuminated. The CPU 32 signals for power to be directed to the red circuit 36 from the blue circuit 38, thereby illuminating the brake lamp 30. Therefore, if deceleration is sensed by the wheel speed sensor 40, the wheel speed sensor 40 communicates this information to the CPU 32. The CPU 32 senses whether power is present in the red circuit 36. If the CPU 32 senses that power is not being supplied to the brake lamp 30, the CPU, through a suitable switch, can direct power to be delivered from the blue circuit 38 to the red circuit 36 and the brake lamp 30 will be illuminated.

Figure 4:
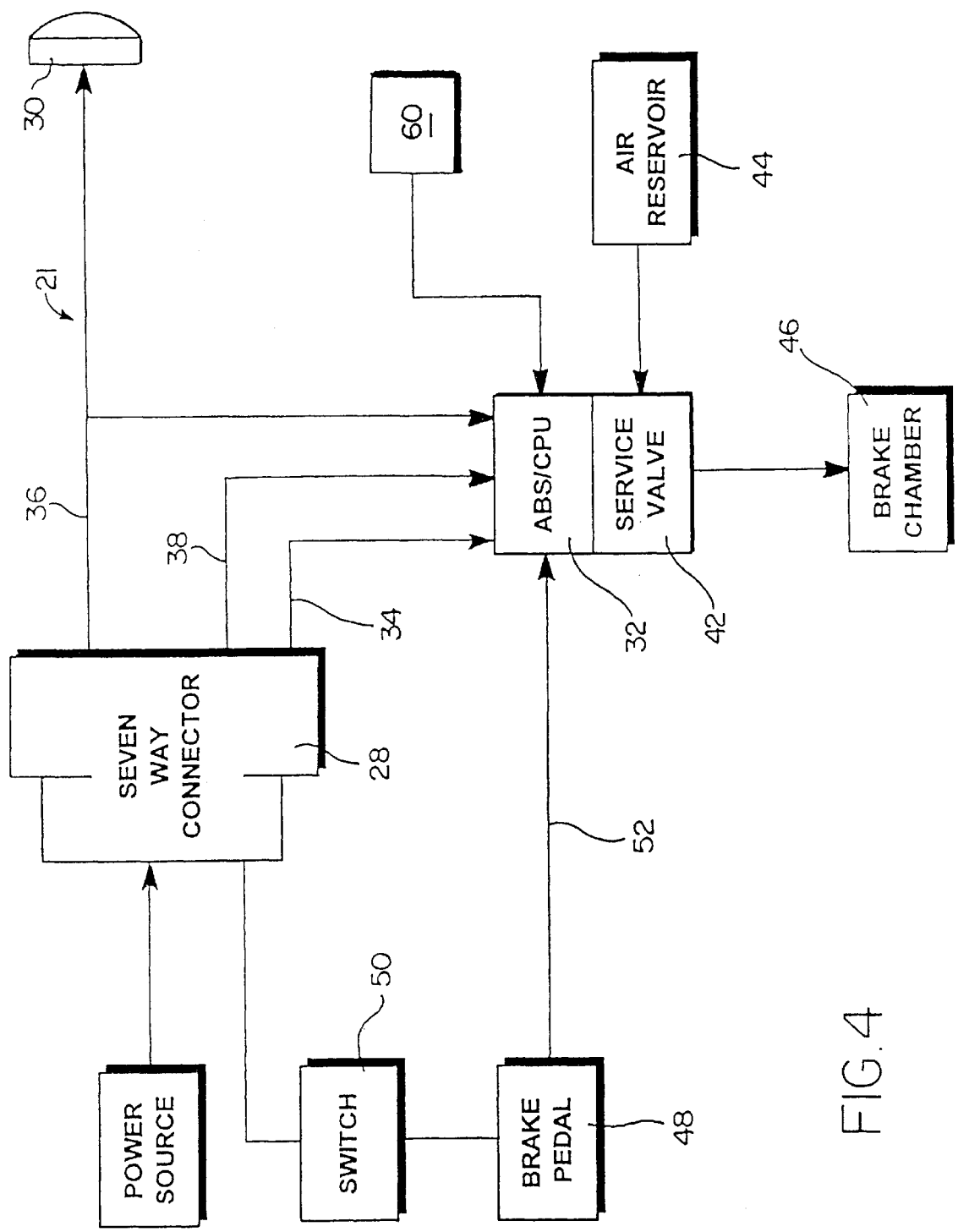
FIG. 4 is a diagram illustrating a second embodiment of the brake lamp illumination system of the present invention.

An alternative embodiment of the brake lamp illumination system 21 is shown in FIG. 4. The brake lamp illumination system 21 is identical to the brake lamp illumination system 20 except for the differences described herein. In the brake lamp illumination system 21, the CPU 32 receives information on deceleration from an accelerometer 60 rather than a wheel speed sensor. In the system 21, the accelerometer 60 is electrically connected to the CPU 32 of the ABS. The accelerometer 60 provides information to the CPU 32 when the trailer 26 decelerates. The accelerometer 60 does not provide wheel lock-up information, however wheel lock-up information is not necessary for this application. If the CPU 32 receives information from the accelerometer 60 that the trailer is decelerating the CPU 32 will determine if power is already present in the red circuit 36. As with the previous embodiment, if power is not sensed in the red circuit 36, power will be supplied to the red circuit 36 from the blue circuit 38 to illuminate the brake lamps 40.

While preferred embodiments of the present invention are shown and described, it is envisioned that those skilled in the art may devise various modifications of the present invention without departing from the spirit and scope of the appended claims.

The invention claimed is:

1. A brake lamp illumination system for a vehicle including:
   a source of power;
   a brake lamp;
   a central processing unit;
   a first circuit in connection with said source of power and said central processing unit which supplies continuous power to said central processing unit from said source;
   a second circuit in connection with the brake pedal of the vehicle and said central processing unit which supplies power to said brake lamp when a brake pedal of the vehicle is applied;
   means for sensing the speed of the wheels of the vehicle, said sensing means being electrically connected to said central processing unit; and
   wherein when said central processing unit receives a signal from said sensing means that the speed of rotation of the wheels of the vehicle is decreasing, said central processing unit senses if power is present in said second circuit,
   wherein if no power is present in said second circuit, power is supplied from said first circuit to said second circuit and said brake lamp is illuminated, and
   wherein if power is present in said second circuit, no power is supplied from said first circuit to said second circuit.

2. A brake lamp illumination system as defined in claim 1, wherein said central processing unit is part of an anti-lock braking system.

3. A brake lamp illumination system as defined in claim 1, wherein said sensing means is an accelerometer.

4. A brake lamp illumination system as defined in claim 1, wherein said sensing means is a wheel speed sensor.

5. A tractor-trailer comprising:
   a brake lamp provided on said trailer;
   wheels provided on said trailer;
   a source of power provided on said tractor;
   a brake pedal provided on said tractor;
   a central processing unit provided on said tractor;
   a connector provided between said tractor and said trailer;
   said connector having a first circuit between said source of power and said central processing unit which supplies continuous power to said central processing unit from said source;
   said connector having a second circuit between said brake pedal of the tractor and said central processing unit which supplies power to said brake lamp when said brake pedal of said tractor is applied;
   means for sensing the speed of said wheels of said trailer, said sensing means being electrically connected to said central processing unit; and
   wherein when said central processing unit receives a signal from said sensing means that the speed of rotation of said wheels of said trailer is decreasing, said central processing unit senses if power is present in said second circuit,
   wherein if no power is present in said second circuit, power is supplied from said first circuit to said second circuit and said brake lamp is illuminated, and
   wherein if power is present in said second circuit, no power is supplied from said first circuit to said second circuit.

6. A tractor-trailer as defined in claim 5, wherein said central processing unit is part of an anti-lock braking system.

7. A tractor-trailer as defined in claim 5, wherein said sensing means is an accelerometer.

8. A tractor-trailer as defined in claim 5, wherein said sensing means is a wheel speed sensor.

9. A method of illuminating a brake lamp on a vehicle upon deceleration of the vehicle comprising the steps of:
   providing a source of power;
   providing a brake pedal;
   providing a brake lamp;
   providing a central processing unit;
   providing a first circuit in connection with said source of power and said central processing unit which supplies continuous power to said central processing unit from said source;
   providing a second circuit in connection with said brake pedal and said central processing unit which supplies power to said brake lamp when said brake pedal is applied;
   providing means for sensing the speed of the wheels of the vehicle, said sensing means being electrically connected to said central processing unit;
   wherein when said central processing unit receives a signal from said wheel speed sensor that the speed of rotation of the wheels of the vehicle is decreasing, said central processing unit senses if power is present in said second circuit,
   wherein if no power is present in said second circuit, power is supplied from said first circuit to said second circuit and said brake lamp is illuminated, and
   wherein if power is present in said second circuit, no power is supplied from said first circuit to said second circuit.

* * * * *